F. E. PAYNE.
PRUNE DIPPER AND TRAYER.
APPLICATION FILED JAN. 26, 1911.
1,057,875.
Patented Apr. 1, 1913.
3 SHEETS—SHEET 3.
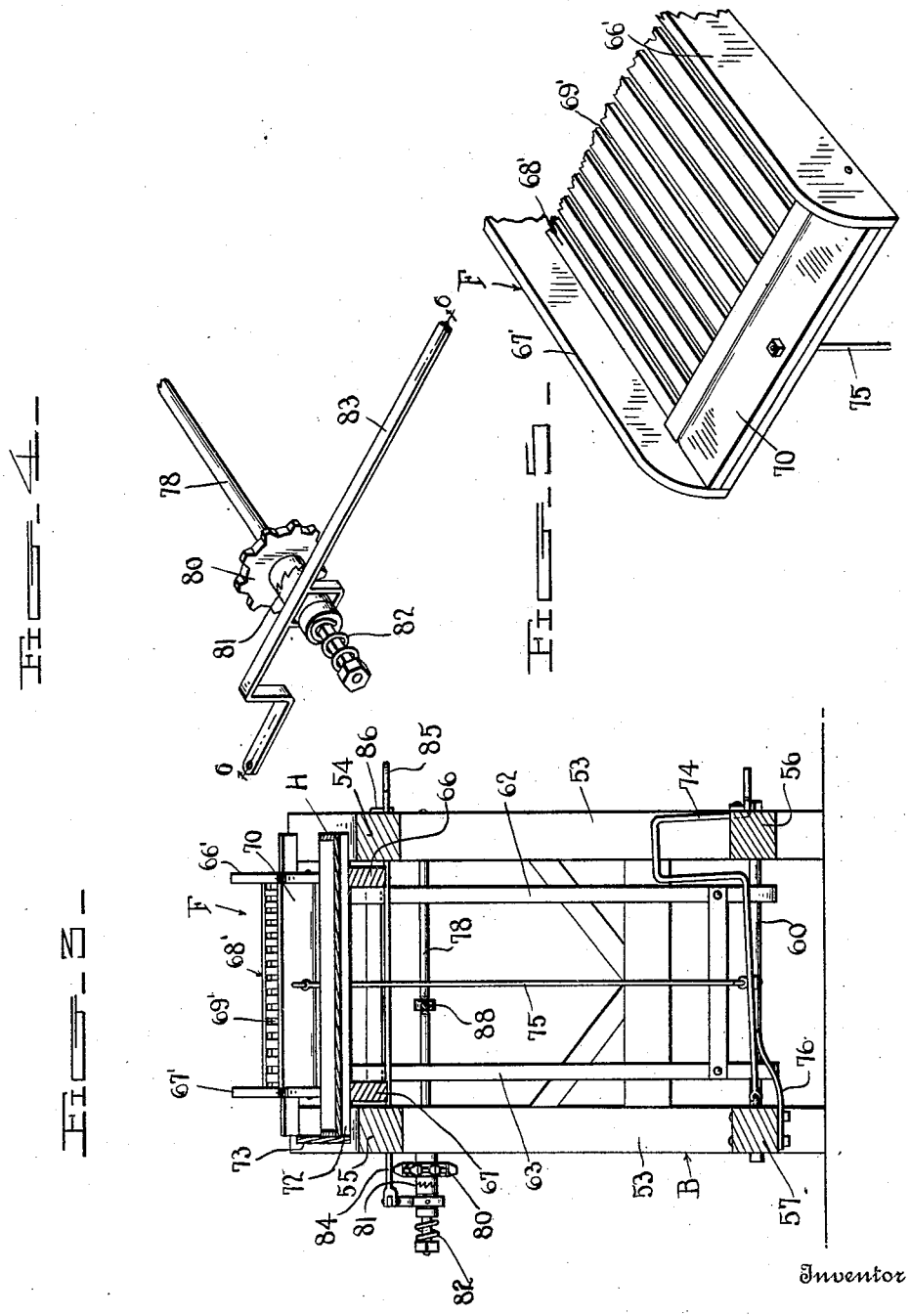
Witnesses
L. B. James
Henry T. Bright
Inventor
F. E. Payne
By 
Attorney

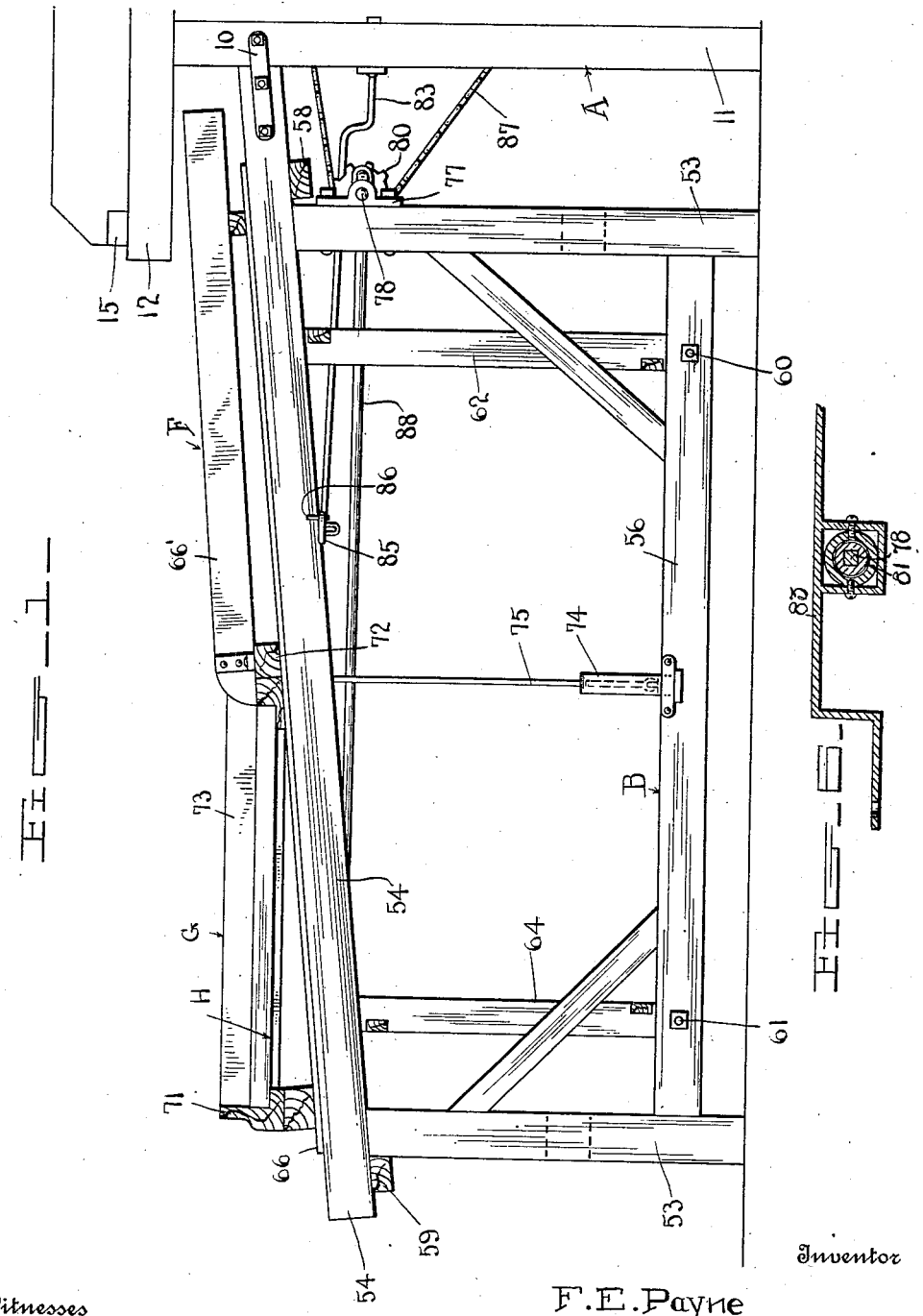

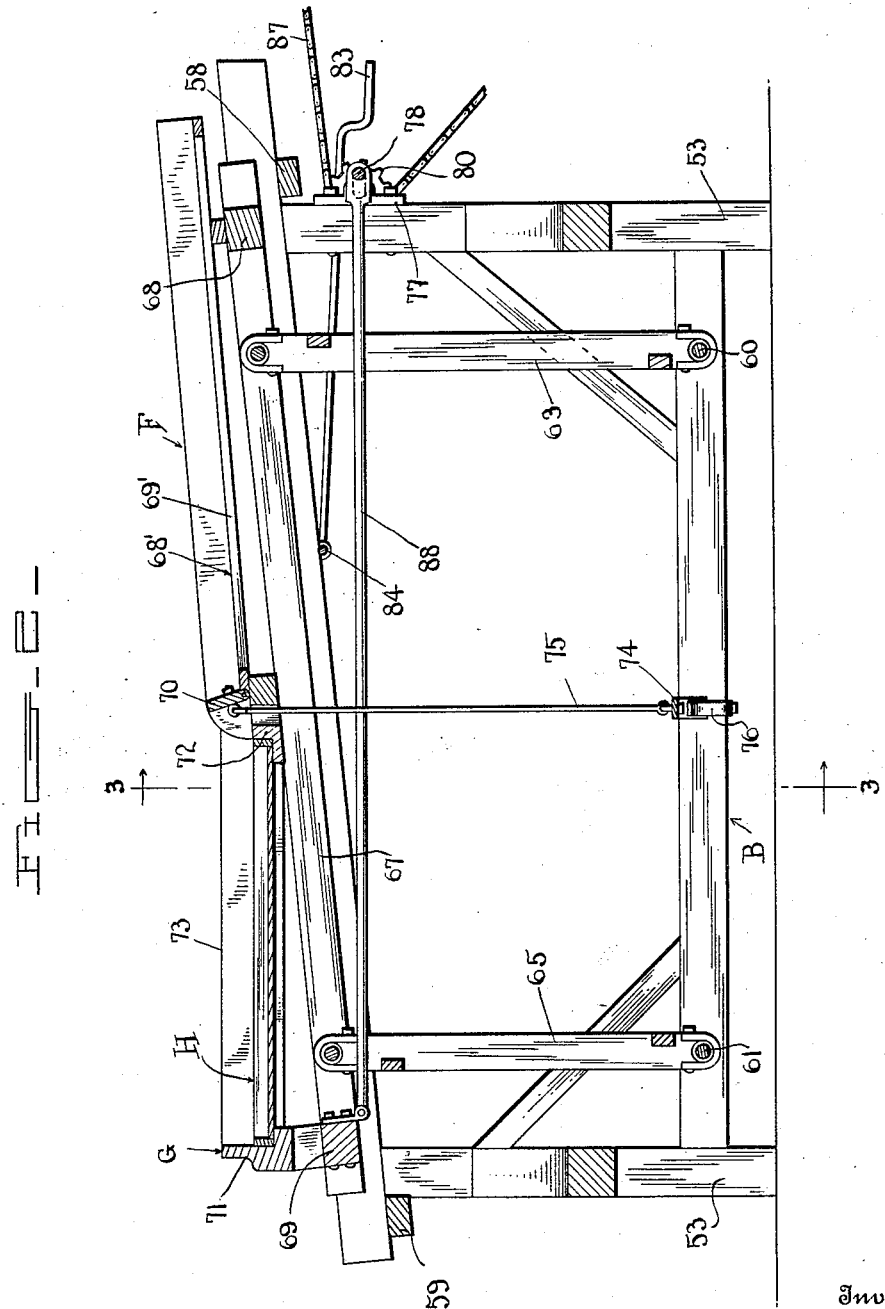

UNITED STATES PATENT OFFICE.

FRANK E. PAYNE, OF CAMAS, WASHINGTON.

PRUNE DIPPER AND TRAYER.

1,057,875.   Specification of Letters Patent.   Patented Apr. 1, 1913.

Application filed January 26, 1911.  Serial No. 604,834.

*To all whom it may concern:*

Be it known that I, FRANK E. PAYNE, a citizen of the United States, residing at Camas, in the county of Clarke, State of Washington, have invented certain new and useful Improvements in Prune Dippers and Trayers; and I do hereby declare the following to be a full, clear, and exact description of the invention, such as will enable others skilled in the art to which it appertains to make and use the same.

This invention relates to prune dippers and trayers.

The object of the invention resides in the provision of a prune trayer which is adapted to be automatically operated so as to deliver the prunes uniformly on to trays.

With these and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 1 is a side elevation of a trayer constructed in accordance with the invention, Fig. 2, a longitudinal section through the trayer, Fig. 3, a section on the line 3—3 of Fig. 2, Fig. 4, a detail perspective view of the clutch mechanism disposed in the actuating means of the trayer. Fig. 5, a detail fragmental perspective view of the delivery end of the screen of the trayer, and Fig. 6, a section on the line 6—6 of Fig. 4.

Referring to the drawings, the trayer is shown as comprising a supporting frame B which includes corner posts 53, inclined upper side members 54 and 55, and lower side members 56 and 57. The upper side members 54 and 55 are connected together at the receiving end of the trayer by means of a cross beam 58 and at the delivery end of the trayer by means of a cross beam 59. The lower side members 56 and 57 are connected together adjacent one end by means of a rod 60, while a similar rod 61 connects said lower side members 56 and 57 together adjacent their other ends. Mounted upon the rods 60 and 61 is a reciprocating frame which comprises a pair of arms 62 and 63 pivotally mounted upon the rod 60 and a pair of arms 64 and 65 pivotally mounted upon the rod 61. The arms 62 and 64 are pivotally connected together at their upper ends to a member 66, while the arms 63 and 65 are pivotally connected at their upper ends to a corresponding member 67. These members 66 and 67 are connected together at the receiving end of the trayer by a cross beam 68, while another cross beam 69 connects said members 66 and 67 together at the delivery end of the trayer. Supported upon the inner end of the frame formed by the members 66 and 67 and the cross beams 68 and 69 is a screen F which is positioned to receive prunes delivered from the dipper. This screen includes side members 66' and 67' which are connected together by a bottom portion 68' provided with a plurality of longitudinal slots 69'.

Controlling the delivery of the screen F is a gate 70 which is pivoted between the side members 66' and 67' and controlled in a manner to be hereinafter referred to. Supported upon the frame by the side members 66 and 67 and the cross beam 69, at the delivery end of the screen F is a tray holder G which is formed of a frame having one side open and including end members 71 and 72 and a side member 73. These end members 71 and 72 are provided with cut away portions on their adjacent faces forming resultant shoulders, and upon these shoulders is adapted to be removably supported a tray H for receiving prunes from the screen F. It will of course be apparent that as soon as the tray is full, it can easily be removed from the tray holder G by passage through the open side of the frame of which said holder is formed. The gate 70 is controlled by means of a lever 74 which is pivoted to the lower side member 57 of the frame B, and connected to said gate by means of a link 75. This lever is normally held in position to close the gate by means of a spring 76, one end of which engages the lever and the other end of which is secured to the lower side member 67. By this construction, it will be apparent that when the lever 75 is depressed, the gate 70 will be opened and as soon as the lever 75 is released, the gate 70 will be moved to closed position by the movement of the lever 75 under the influence of the spring 76. In this respect, it will be apparent that as soon as the tray carried by the holder G has been completely filled, the gate is moved to closed position until the next tray is inserted in the holder.

In order to effect the automatic reciprocation of the frame formed by the arms 62, 63, 64 and 65; members 66 and 67, and cross beams 68 and 69, there is mounted on the inner corner posts 53 of the frame B journal bearings 77, and in these bearings is journaled a shaft 78. This shaft has one end extended beyond the adjacent journal bearing and loosely mounted upon this extended end is a sprocket wheel 80, and between this sprocket wheel and the adjacent end of the shaft 78 is splined a clutch 81. This clutch is normally forced into operative engagement with the sprocket wheel 80 by means of a spring 82. In order to shift the clutch out of engagement with the sprocket wheel 80, there is provided a pivoted lever 83 which is so connected to the clutch as to permit the free rotation of the latter under the influence of the shaft 78 but which will shift said clutch longitudinally of said shaft when said lever is oscillated on its pivot. This lever is controlled by means of a link rod 84 which is connected to the free end thereof and extends to the opposite side of the frame B where it terminates in a grip handle 85. A catch pin 86 mounted on the side member 54 is positioned to engage the looped handle 85 when the clutch has been operated against the influence of the spring 82 and thus lock said clutch inactive.

The shaft 78 is rotated by means of a sprocket chain 87 which travels on the sprocket wheel 80, said chain being operated from a suitable source of power not shown. The shaft 78 has its central portion offset to form a crank arm, and this crank is connected to the cross beam 69 by means of a link 88 so that when said shaft is rotated, the arms 62, 63, 64 and 65 will be oscillated on their pivots and produce a reciprocation of the frame formed by the member 66 and 67 and the cross beams 68 and 69, this rocking of said frame serving to work the prunes from the screen F to the tray H and properly distribute same upon said tray.

What is claimed is:—

A traying device comprising a supporting frame, a reciprocating frame carried by said supporting frame and movable longitudinally thereof, means for reciprocating said frame, a screen carried by said reciprocating frame, a hinged gate mounted on said screen and controlling the delivery end thereof, means for normally holding said gate closed, lever operated means for opening said gate, and a tray holder mounted on the reciprocating frame at the delivery end of the screen.

In testimony whereof, I affix my signature, in presence of two witnesses.

FRANK E. PAYNE.

Witnesses:
O. F. JOHNSON,
E. BAUMAN.

---

Copies of this patent may be obtained for five cents each, by addressing the "Commissioner of Patents, Washington, D. C."